US006714316B1

(12) United States Patent
Nishiyama

(10) Patent No.: US 6,714,316 B1
(45) Date of Patent: Mar. 30, 2004

(54) IMAGE FORMING APPARATUS, IMAGE FORMING SYSTEM, COMPUTER-READABLE RECORD MEDIUM STORED WITH IMAGE FORMING PROGRAM, AND IMAGE FORMING METHOD

(75) Inventor: Junichi Nishiyama, Atsugi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/401,140

(22) Filed: Sep. 22, 1999

(30) Foreign Application Priority Data

Sep. 22, 1998 (JP) .......................................... 10-268134

(51) Int. Cl.[7] ............................................... G06F 15/00

(52) U.S. Cl. .................... 358/1.18; 358/1.12; 358/1.13; 358/1.14; 358/1.15; 358/296; 358/468

(58) Field of Search ............................... 358/1.18, 1.12, 358/1.13, 1.14, 1.15, 468, 296; 399/403, 407; 220/58.01, 58.08

(56) References Cited

U.S. PATENT DOCUMENTS 5,774,778 A * 6/1998 Adachi et al. ............. 399/403
5,823,529 A * 10/1998 Mandel et al. .............. 271/296
5,987,225 A * 11/1999 Okano ....................... 358/1.13
6,041,214 A * 3/2000 Fujikura et al. ............ 399/403

FOREIGN PATENT DOCUMENTS

JP 8-73107 3/1996

* cited by examiner

*Primary Examiner*—Edward Coles
*Assistant Examiner*—Twyler Lamb
(74) *Attorney, Agent, or Firm*—Morrison & Foerster LLP

(57) ABSTRACT

An image forming apparatus includes a receiving unit for receiving a printing job including image data, a counting unit for counting a number of sheets required by the printing job when an image for one page is formed on a sheet of paper, an image forming unit for forming images for a plurality of pages on a sheet of paper when the number of sheets exceeds a prescribed value, and a tray for receiving a image formed sheet. The image forming apparatus enables outputting an entire image data even when the number of sheets required for printing the entire image data exceeds a capacity of the tray.

38 Claims, 9 Drawing Sheets

IMAGE FORMING APPARATUS, IMAGE FORMING SYSTEM, COMPUTER-READABLE RECORD MEDIUM STORED WITH IMAGE FORMING PROGRAM, AND IMAGE FORMING METHOD

This application is based on Japanese Patent Application No. 10-268134 filed on Sep. 22, 1998, the contents of which are hereby incorporated by reference.

BACKGROUND OF THE INVENTION

1. Field of the Invention

The invention relates to image forming apparatuses such as copying machines and printers, an image forming system for printing an image data outputted by a computer, and a computer-readable record medium stored with an image forming program for computers, printers or copying machines.

2. Description of the Related Art

Some of the image forming apparatuses represented by printers and copying machines are equipped with a large capacity storage device such as a hard disk device. The storage device is used for temporarily storing an image data before they are printed on paper.

Those image forming apparatuses are normally equipped with a tray for collecting papers after printing. It happens in some cases that the number of pages required for printing all the data stored in the storage device exceeds the capacity of such a tray. In such a case, the printing action of the image forming apparatus may stop short of printing the entire stored image data, or worse, may cause a paper jam condition in the mechanism used for discharging the printed paper.

SUMMARY OF THE INVENTION

It is a general object of the invention is to make it possible to print an entire image data even if the number of sheets necessary for printing the entire image data exceeds the capacity of the tray.

Another object of the invention is to provide an image forming apparatus including a receiving unit for receiving a printing job that includes image data, a counting unit for counting a number of sheets required by the printing job when an image for one page is formed on a sheet of paper, an image forming unit for forming images for a plurality of pages on a sheet of paper when the number of sheets exceeds a prescribed value, and a tray for receiving an image formed sheet.

Another object of the invention is to provide an image forming system including a printer for printing an image data, and a computer for preparing the image data. The computer includes a counting means for counting a number of sheets required by prepared image data when an image for one page is formed on a sheet of paper, an image preparing means for newly preparing image data for forming images for a plurality of pages on a sheet of paper when the number of sheets exceeds a prescribed value, a job preparing means for preparing a printing job containing the newly prepared image data, and a transmitting means for transmitting the printing job to the printer.

Another object of the invention is to provide a record medium stored in a computer-readable manner a program to be executed by the computer for printing an image data on a paper. The program includes the steps of (A) acquiring a number of sheets required by prepared image data when an image for one page is formed on one sheet of paper, (B) newly preparing image data for forming images for a plurality of pages on a sheet of paper when the number of sheets exceeds the prescribed value, (C) preparing a printing job including the newly prepared image data, and (D) transmitting the printing job to a printer.

Another object of the invention is to provide an image forming method includes the steps of (A) receiving a printing job including image data, (B) acquiring a number of sheets required for a printing job when an image for one page is formed on a sheet of paper, (C) forming images for a plurality of pages on a sheet of paper when the number of sheets exceeds the prescribed value, and (D) discharging an image formed sheet to a tray.

The objects, characteristics, and advantages of this invention other than those set forth above will become apparent from the following detailed description of the preferred embodiments, which refers to the annexed drawings.

DETAILED DESCRIPTION OF THE EMBODIMENTS

The embodiments of this invention will be described below with reference to the accompanying drawings.

Embodiment 1

Figure 1:
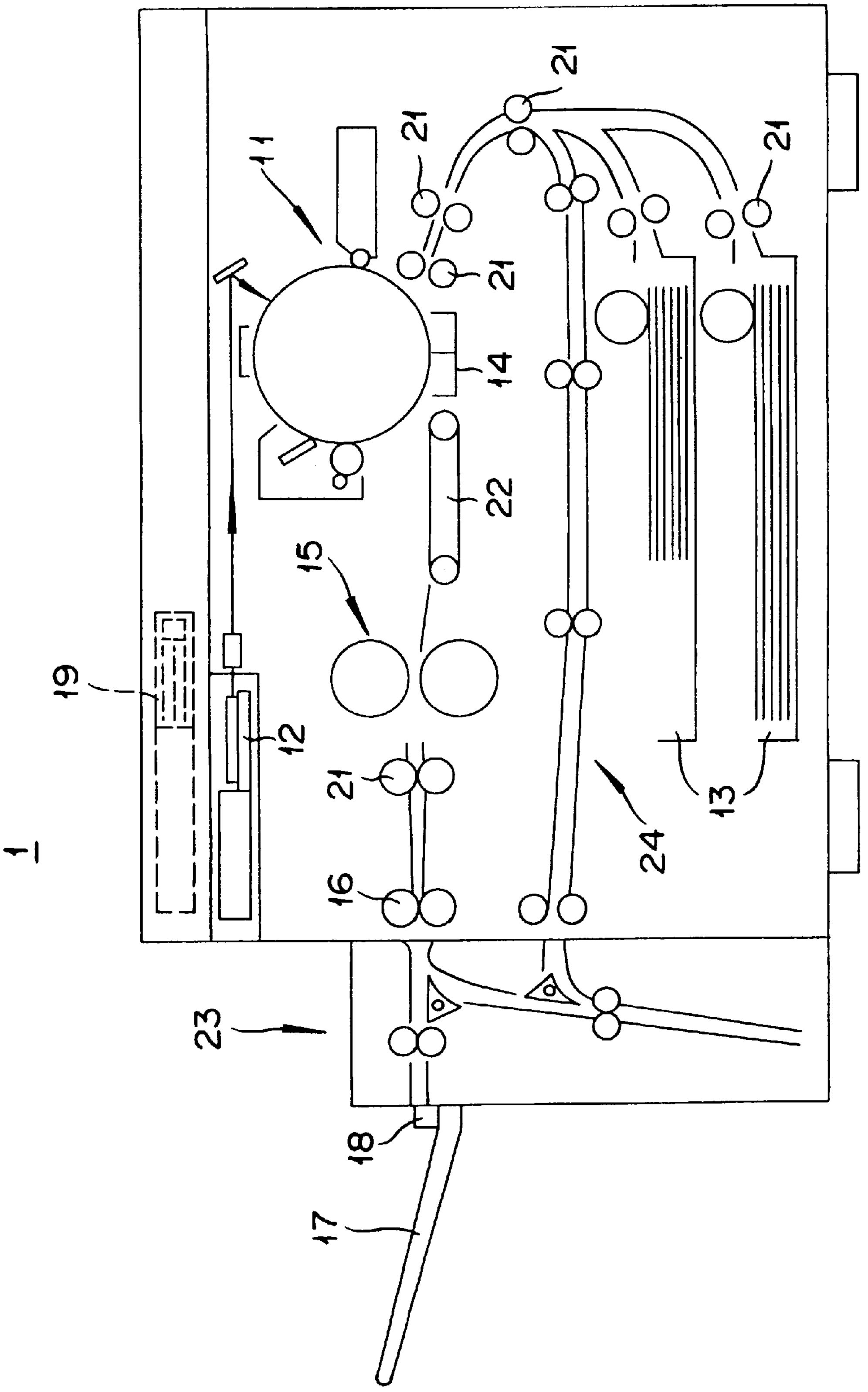
FIG. 1 is a cross section of a printer according to the first embodiment of the present invention.

The image forming apparatus 1 shown in FIG. 1 is an electrophotographic type printer containing a hard disk device for temporarily storing an image data received from external equipment such as a computer and a tray 17 for storing paper to be discharged after printing. The printer 1 is capable of printing an entire stored image data by executing a reduction process. As described in detail later, the reduction process is composed of printing the image data for a plurality of pages on a single sheet of paper, when the number of sheets required for printing the entire stored image data or the image data for the entire pages of the particular document exceeds the capacity of the tray 17.

Now, the mechanical structure of the printer 1 is described in outline.

The printer 1 includes a photoconductor drum 11 on which a latent electrostatic image is formed, an illuminating unit 12 for forming the latent electrostatic image on the photoconductor drum 11, a paper cassette 13 in which papers are stored for image forming, a transferring charger 14 for transferring the latent electrostatic image on the photoconductor drum 11 to the paper, a fixing unit 15 for fixing the image transferred onto the paper, a discharging roller pair 16 for discharging the paper after fixing, the tray 17 for collecting the discharged paper, and a pair of a transporting roller 21 and a transporting belt 22 for transporting the paper in the paper cassette 13 to the discharging roller pair 16 via the photoconductor drum 11 and the fixing unit 15. The illuminating unit 12 includes such a device as a semiconductor laser or a light emitting diode (LED).

The printer 1 further includes a double-side unit 23 for turning over the paper discharged from the discharging roller pair 16 for the purpose of double-side printing, and a transporting passage 24 for transporting the turned-over paper again to the photoconductor drum 11. It also has a sensor 18 in the vicinity of the tray 17. The sensor 18 has a function of counting the number of sheets of paper discharged or collected on the tray 17 and the function of detecting whether there are any sheets on the tray 17. On the top side of the printer 1, an operating panel 19 is provided to display various inputs and various messages required for the printer 1. The operating panel 19, for example, consists of a liquid crystal touch panel.

Figure 2:
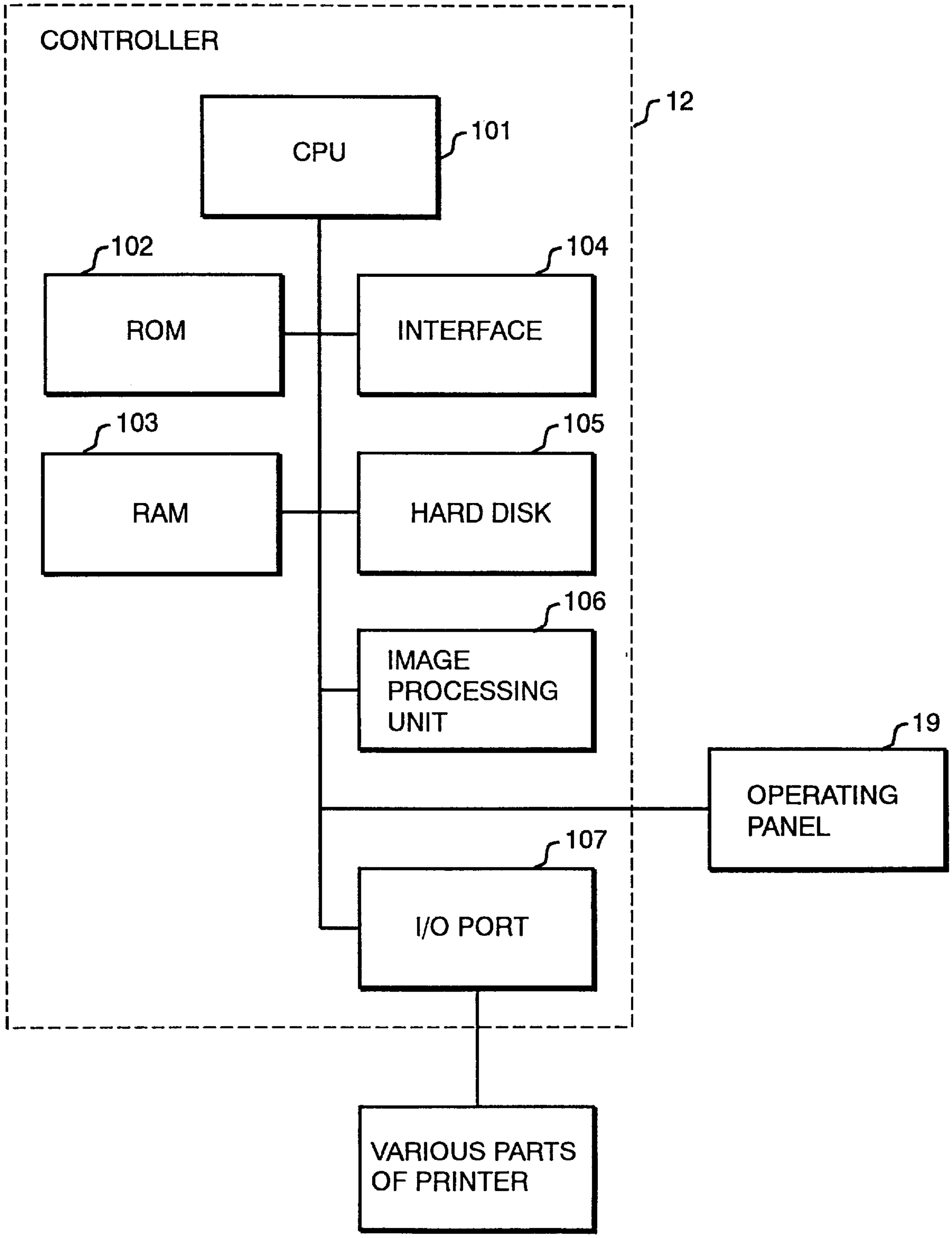
FIG. 2 is a block diagram of a controller of the printer.

Now, the controller of the printer 1 is described referring to FIG. 2.

The controller includes a CPU 101 for executing a prescribed program, a ROM 102 for storing the prescribed program, a RAM 103 to be used as a working area used by the CPU 101 for expanding data in the execution of the program, an interface 104 for exchanging the necessary data such as an image data with the external computer, a hard disk device 105 for storing received image data, and an image processing unit 106 for executing various image processes such as a process for reducing/enlarging an image for printing, 2in-1 process, or 4-in-1 process. These parts are connected to lines. The 2-in-1 process is an image process for printing image data that corresponds to two pages on one side of a sheet of paper. The 4-in-1 process is an image process for printing image data that corresponds to four pages on one side of a sheet of paper.

Furthermore, the controller is connected to the operating panel 19 via a line, while it is also connected to various printer parts such as the photoconductor drum 11, the illuminating unit 12, the fixing unit 15, the sensor 18, a drive source for the transporting roller 21 and transporting belt 22, and the double-side unit 23 via I/O port 107.

Figure 3:
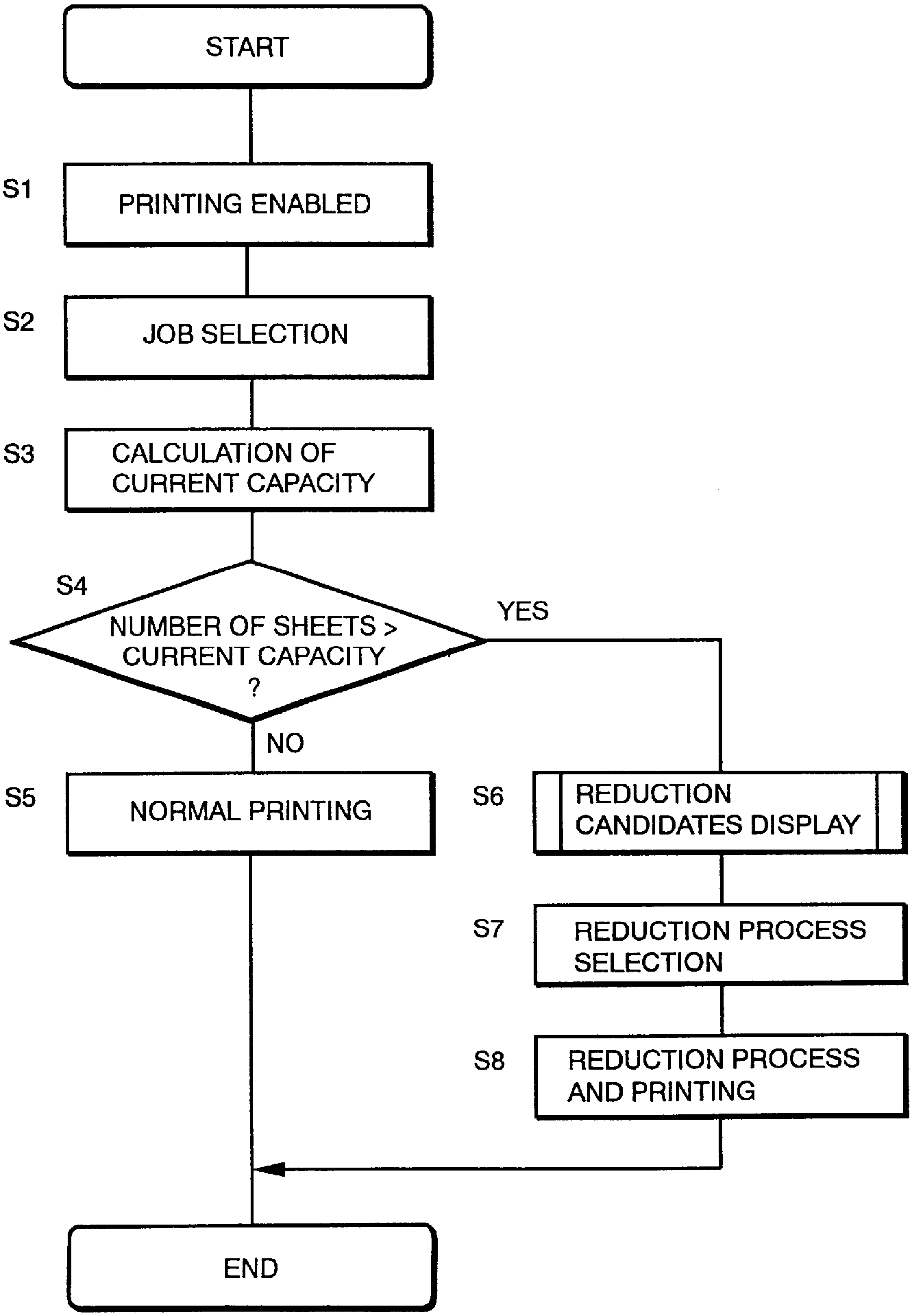
FIG. 3 is a flow chart of a processing sequence of the printer.

Now, the operations of the printer after the image data that has been received from external equipment such as a computer is stored in the hard disk device 105 is described referring to FIG. 3.

First of all, when the printing button on the operating panel 19 is depressed, printing is enabled (step S1). It is also possible to keep the printing always enabled and advance the process to the step S2 at a point when the image data received from external equipment such as a computer is stored on the hard disk device 105.

Figure 4:
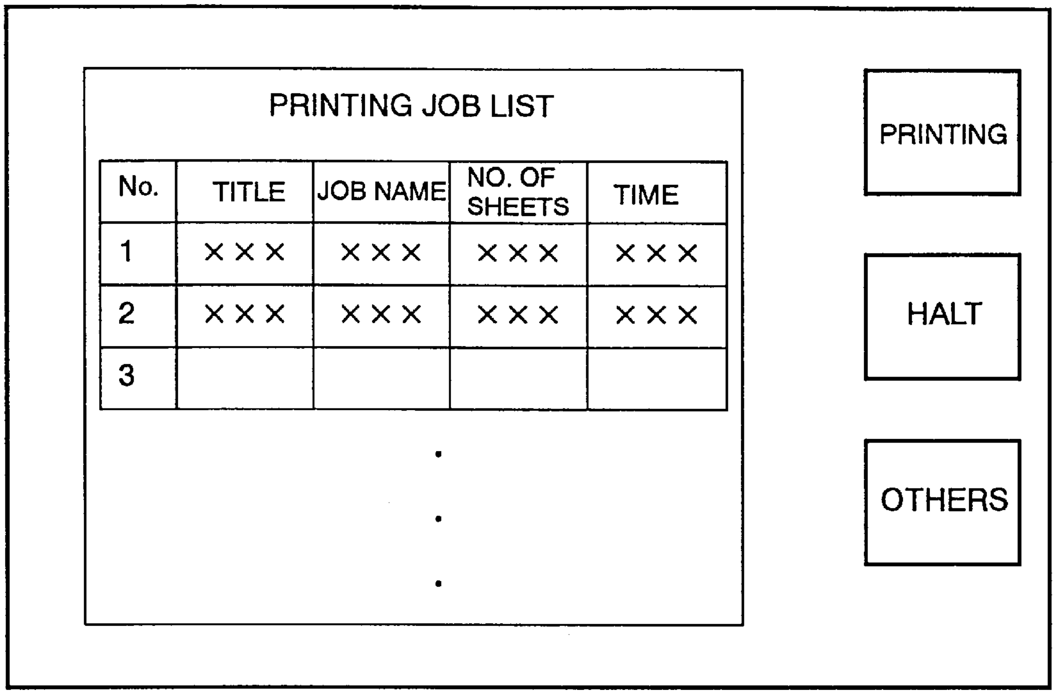
FIG. 4 is a display example for selecting a job to be printed.

Next, a job to be printed is selected from among the jobs currently stored on the hard disk device 105 (step S2). More specifically, when the printing button is depressed, a printing job list will be displayed on the operating panel 19 of the printer 1 as shown in FIG. 4, and the user specifies a job to be printed from the list. Without recourse to manual input operation, the selection of the job can also be done in the order of storage to start printing, automatically.

Next, the current capacity of the tray 17 is calculated (step S3). The current capacity of the tray 17 is obtained by reducing the number of sheets currently existing on the tray 17 from the preset initial capacity of the tray 17. The number of sheets existing on the tray 17 is calculated from the height of paper stacked on the tray 17 to be detected by the sensor 18.

Next, the number of sheets required for printing the selected job under normal printing is compared with the current capacity of the tray 17 (step S4). The normal printing means printing an image data equivalent to a page of the document on one side of a sheet of paper. If it is ascertained that the number of sheets required for the normal printing does not exceed the current capacity as a result of the comparison of the step S4, the image data is printed in its entirety (step S5) to end the process.

Figure 5:
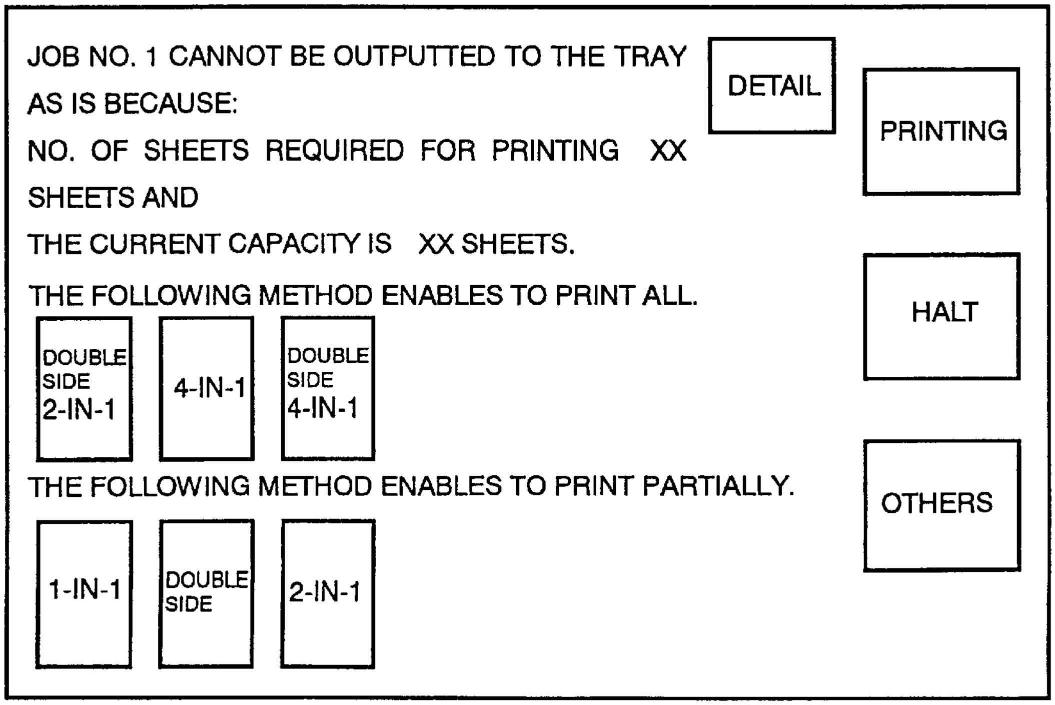
FIG. 5 is a display example of reduction candidates.

If it is judged that the number of sheets to be printed exceeds the current capacity as a result of the step S4, reduction candidates will be displayed on the operating panel 19 (step S6). The reduction candidates include various forms that enable to output the entire image data by printing the image data for a plurality of pages on a single sheet of paper. The displayed items are typically messages and forms of reduction processes as shown in FIG. 5. The messages mainly include the content indicating that the number of sheets required for printing the entire image data exceeds the capacity of the tray when the normal printing is executed.

In case of an example shown in FIG. 5, the formats of the reduction process are double-side 2-in-1, 4-in-1 process, and double-side 4-in-1 process as the reduction candidates for printing the entire image data, or 1-in-1 process, double-side process, and 2-in-1 process as the reduction candidates for printing a portion of the image data or the image data for the first page through a certain page of the document. The double-side 2-in-1 process is an image process for printing image data equivalent to four pages on two sides of a single sheet of paper or two pages of image per side. The double-side 4-in-1 process is an image process for printing image data equivalent to eight pages of the document on two sides of a single sheet of paper or four pages of image per side. The 1-in-1 process is a normal image process for printing without using the reduction process or the double-side printing technique.

Next, the user selects one of the displayed reduction candidates as needed (step S7). The printing is then executed according to the selected reduction process, and the printed paper is discharged to the tray 17 (step S8).

For example, when the 2-in-1 process is selected at the step S7, image data equivalent to two pages are read from the hard disk device 105 and reduced by the image processing unit 106 of the controller so that they can be printed on one side of a single sheet of paper. After that, the image data equivalent to two pages are printed on one side of a sheet of paper and the sheet is discharged.

If the double-side process is selected at the step S7, an image data equivalent to one page of the document is read from the hard disk device 105 to be printed on one side of a sheet of paper, and, after the sheet is turned over by the double-side unit 23, an image data for the next one page is read from the hard disk 105 to be printed on the other side of the sheet. The sheet printed with the image corresponding to one page on each side is then discharged.

Figure 6A:
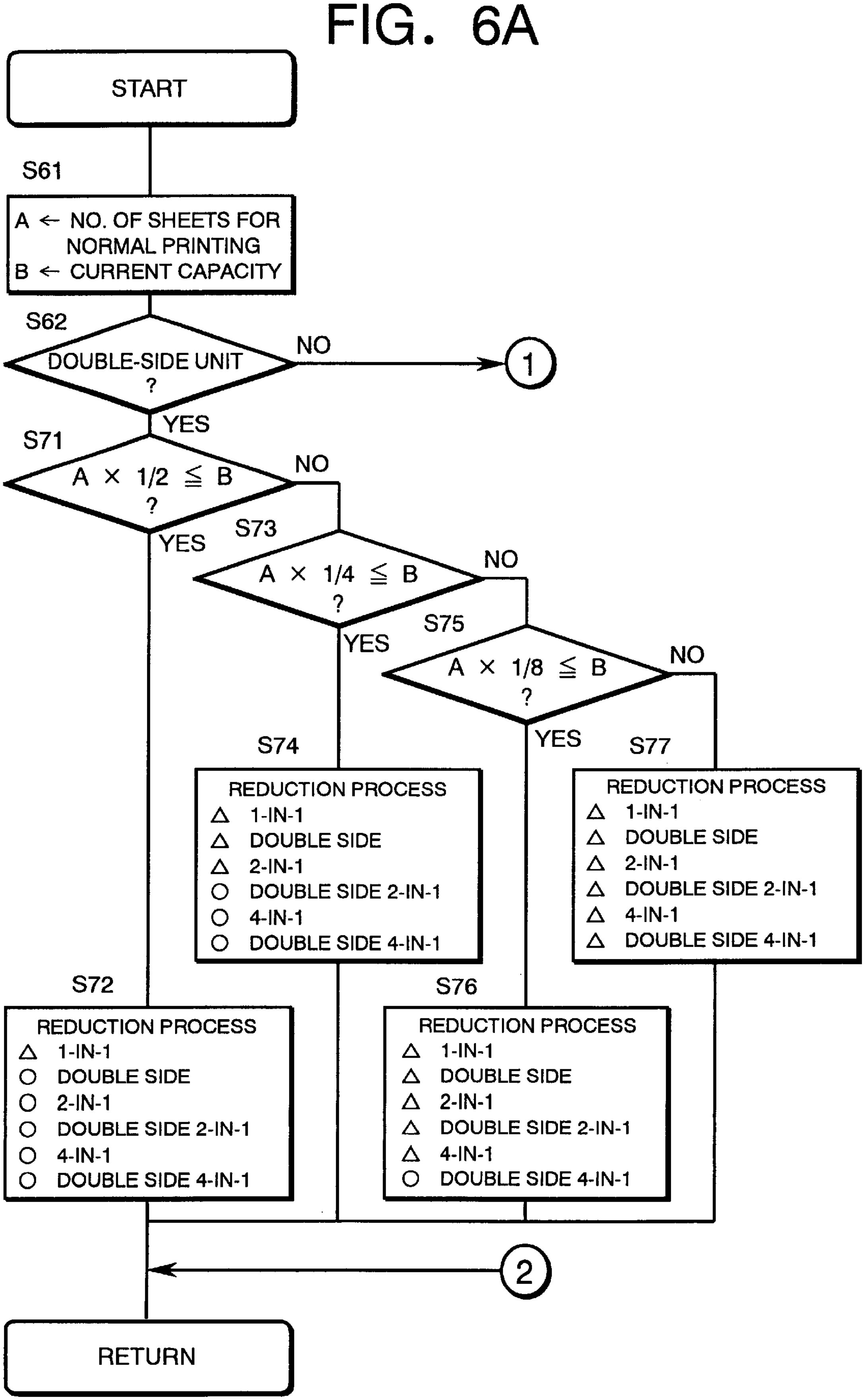
FIGS. 6(*a*) and 6(*b*) are a flow chart of processing sequence for displaying reduction candidates.
Figure 6B:
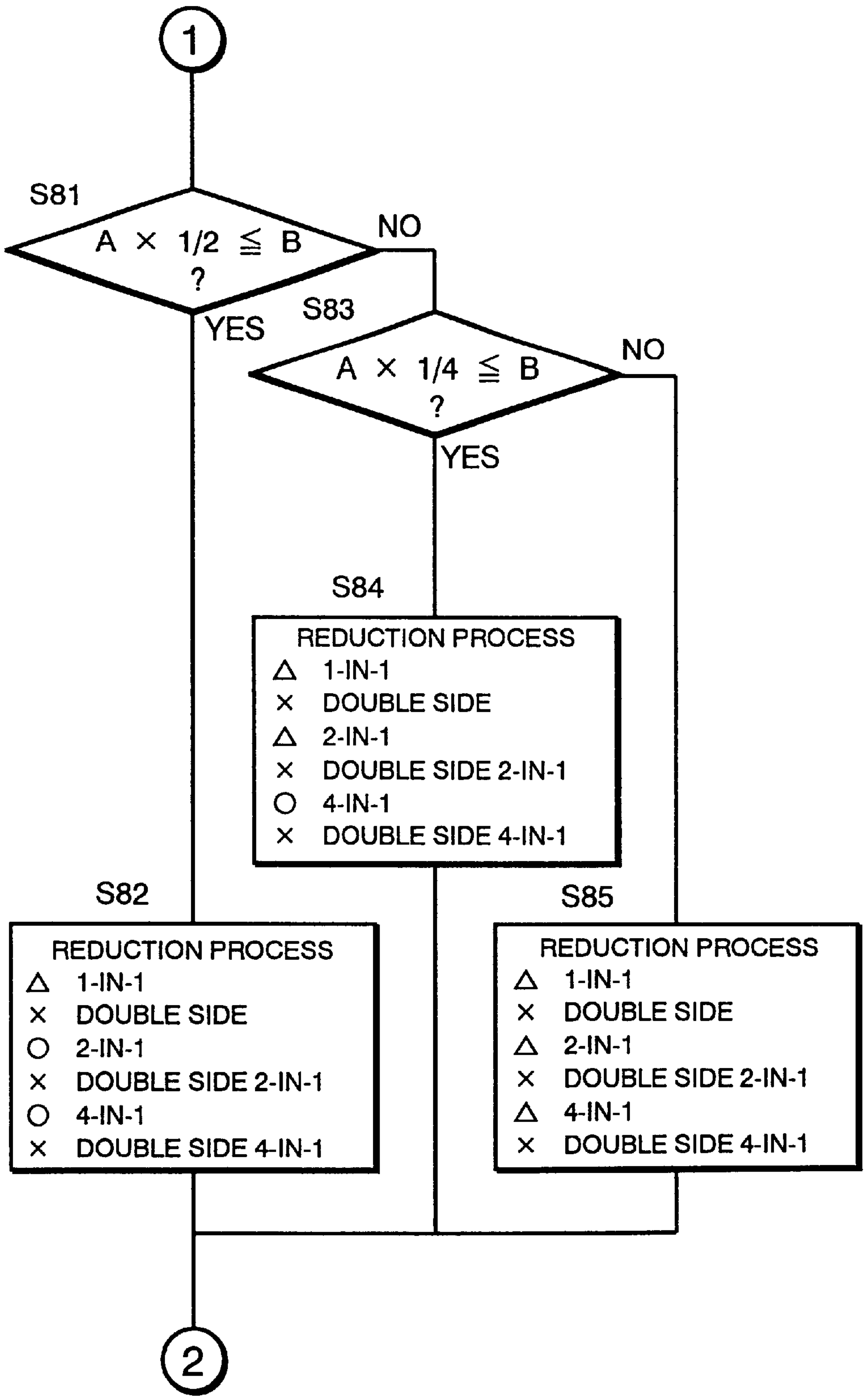
Figure 7:
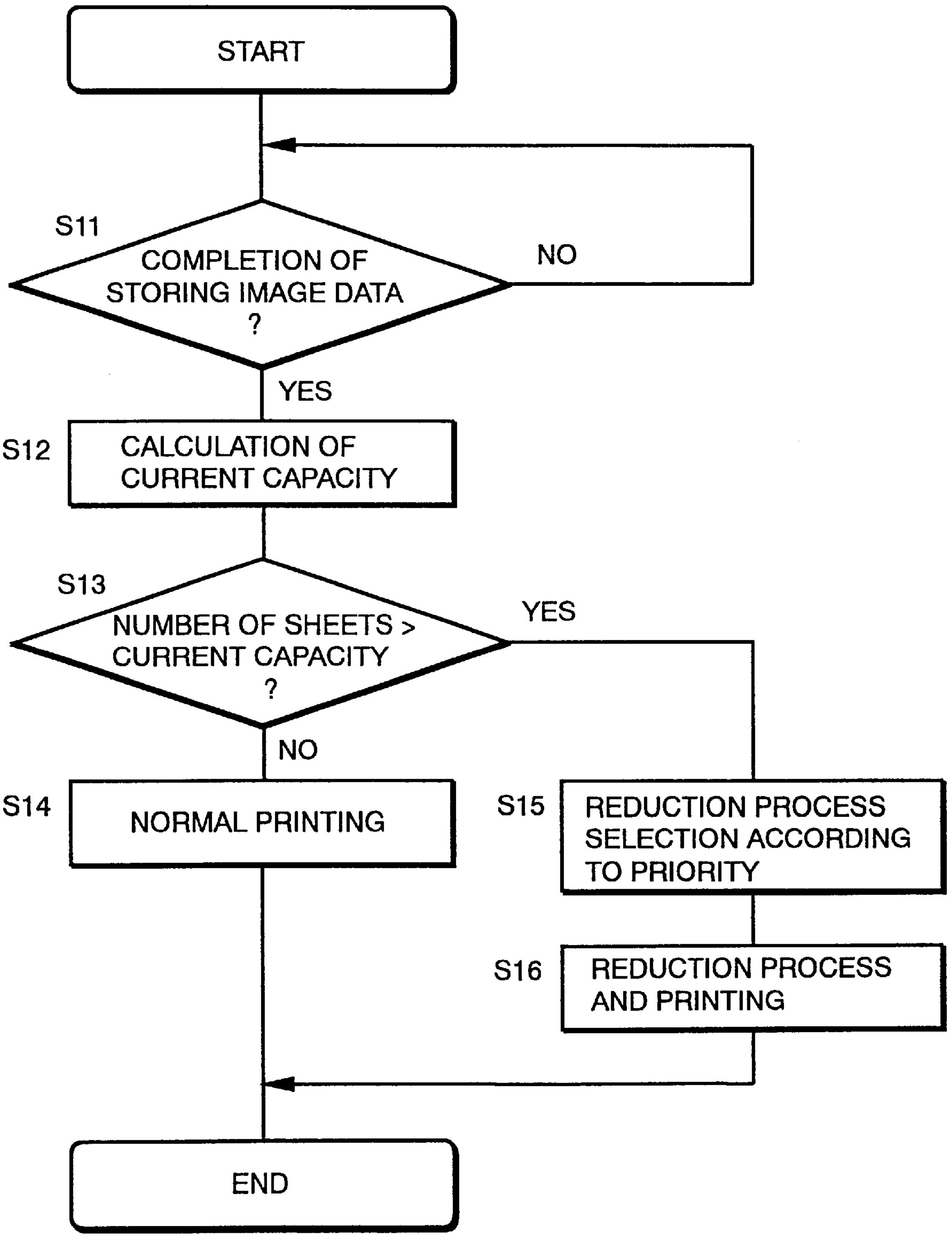
FIG. 7 is a flow chart of a processing sequence of a printer according to the second embodiment of the present invention.

Now, the display procedure of the reduction candidates at the step S6 is described in detail referring to FIG. 6.

First, the number of sheets required for the normal printing of the document and the current capacity of the tray are set as the variable A and the variable B, respectively (step S61).

Next, a decision is made as to whether the double-side unit is provided (step S62). The step S62 is provided to apply on a printer having no double-side unit a process similar to that of a printer having a double-side unit.

When it is ascertained at the step S62 that the particular printer is equipped with a double-side unit, one half of the number of sheets required for the normal printing is compared with the current capacity of the tray (step S71).

If it is determined that it is possible to print the entire image data by reducing the number of sheets required for printing to one half at the step S71, the double-side process, the 2-in-1 process, the double side 2-in-1 process, the 4-in-1 process and the double side 4-in-1 process will be displayed as the reduction candidates, while the 1-in-1 process will be displayed as the reduction candidate for printing a portion of the image data (step S72).

If it is determined that it is impossible to print the entire image data even if the number of sheets required for printing is reduced to one half at the step S71, one quarter of the number of sheets required for the normal printing is compared with the current capacity of the tray (step S73).

If it is determined that it is possible to print the entire image data by reducing the number of sheets required for printing to one quarter at the step S73, the double-side 2-in-1 process, the 4-in-1 process and the double side 4-in-1 process will be displayed as the reduction candidates, while the 1-in-1 process, the double-side process and the 2-in-1 process will be displayed as the reduction candidates for printing a portion of the image data (step S74).

If it is determined that it is impossible to print the entire image data even if the number of sheets required for printing is reduced to one quarter at the step S73, one eighth of the number of sheets required for the normal printing is compared with the current capacity of the tray (step S75).

If it is determined that it is possible to print the entire image data by reducing the number of sheets required for printing to one eighth at the step S75, the double-side 4-in-1 will be displayed as the reduction candidate, while the 1-in-1 process, the double-side process, the 2-in-1 process, the double-side 2-in-1 process and the 4-in-1 process will be displayed as the reduction candidates for printing a portion of the image data (step S76).

If it is determined that it is impossible to print the entire image data even if the number of sheets required for printing is reduced to one eighth at the step S75, the system displays a message that the entire image data cannot be printed even with the reduction process, and the 1-in-1 process, the double-side process, the 2-in-1 process, the double-side 2-in-1 process, the 4-in-1 process and the double-side 4-in-1 process will be displayed as the reduction candidates for printing a portion of the image data (step S77).

On the other hand, if it is ascertained at the step S62 that the particular printer is not equipped with a double-side unit, one half of the number of sheets required for the normal printing is compared with the current capacity of the tray (step S81).

If it is determined that it is possible to print the entire image data by reducing the number of sheets required for printing to one half at the step S81, the 2-in-1 process and the 4-in-1 process will be displayed as the reduction candidates, while the 1-in-1 process will be displayed as the reduction candidate for printing a portion of the image data (step S82).

If it is determined that it is impossible to print the entire image data even if the number of sheets required for printing is reduced to one half at the step S81, one quarter of the number of sheets required for the normal printing is compared with the current capacity of the tray (step S83).

If it is determined that it is possible to print the entire image data by reducing the number of sheets required for printing to one quarter at the step S83, the 4-in-1 process will be displayed as the reduction candidate, while the 1-in-1 process and the 2-in-1 process will be displayed as the reduction candidates for printing a portion of the image data (step S84).

If it is determined that it is impossible to print the entire image data even if the number of sheets required for printing is reduced to one quarter at the step S83, the system displays a message that the entire image data cannot be printed even with the reduction process, and the 1-in-1 process, the 2-in-1 process, and the 4-in-1 process will be displayed as the reduction candidates for printing a portion of the image data (step S85).

The symbols ○, Δ and X used at the steps S72, S74, S76, S77, S82, S84 and S85 shown in FIG. 6 represent respectively the reduction candidate that enables full printing, the reduction candidate that enables partial printing, and the reduction candidate that is not displayed as it is a function not provided by the particular printer.

As seen in the above, when the number of the sheets required for printing the entire image data received from external equipment such as a computer and temporarily stored on the hard disk device 105 exceeds the capacity of the tray 17, the printer 1 can print the entire image data by executing a reduction process specified by the user to print out the image data for a plurality of pages on a sheet of paper. Moreover, since the printer 1 is equipped with the sensor 18 that detects the number of sheets stacked on the tray 17, the system can determine the current capacity of the tray 17. Therefore, even if a certain amount of printed sheets are already stacked on the tray 17, and the number of sheets that can be discharged is small, it still may be able to print the entire image data without exceeding the capacity of the tray 17.

Embodiment 2

In the first embodiment, the user selects the reduction process when the number of sheets required for printing the entire image data exceeds the capacity of the tray. On the other hand, the reduction process is automatically executed according to the prescribed priority in the second embodiment. The descriptions of the function and structure of the printer similar to those of the first embodiment will be omitted.

Now, the operations of the printer 1 after an image data received from external equipment such as a computer is stored in the hard disk device 105 is described referring to FIG. 3.

First, when it is ascertained that the storing process of the image data is completed at the step S11, the current capacity of the tray 17 will be calculated (step S12). The current capacity of the tray 17 is obtained by reducing the number of sheets currently existing on the tray 17 from the preset initial capacity of the tray 17. The number of sheets existing on the tray 17 is calculated from the height of papers stacked on the tray 17 to be detected by the sensor 18.

Next, the number of sheets required for printing the job stored on the hard disk device 105 under normal printing is compared with the current capacity of the tray 17 (step S13). If a plurality of jobs are stored in the hard disk device 105, this comparison is applied to a job with the highest priority.

If it is ascertained that the number of sheets required for the normal printing does not exceed the current capacity of the tray 17 as a result of the comparison of the step S13, the image data is printed in its entirety (step S14) to end the process.

If it is judged that the number of sheets to be printed exceeds the current capacity as a result of the comparison at the step S13, a reduction candidate for printing an entire image data will be selected based on the prescribed priority (step S15).

Figure 8:
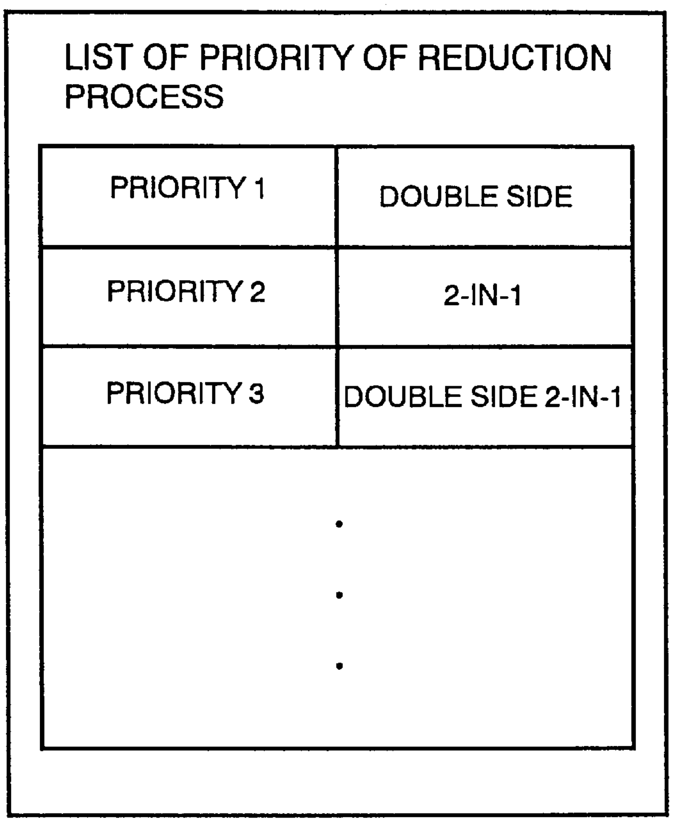
FIG. 8 is a list showing a priority of the reduction process.

The priority for the reduction processes as used is stored in the hard disk device 105 in the list format shown in FIG. 8. The double-side printing shown in the list of FIG. 8 will be omitted if the particular printer is not equipped with a double-side unit 23. The list is prepared by extracting the reduction candidates for printing the entire image data as an internal process in advance, and it is similar to the procedure for displaying the reduction candidates shown in FIG. 6 in relation to the first embodiment.

Next, printing is executed according to the selected reduction process and the sheets are discharged to the tray 17 (step S16).

As seen in the above, when the number of the sheets required for printing the entire image data received from external equipment such as a computer and stored on the hard disk device 105 exceeds the capacity of the tray 17, the printer according to the second embodiment can automatically select the reduction process, print the entire image data, and discharge the printed sheets.

In both the first and second embodiments, the program pre-stored on the printer ROM 102 is executed based on the CPU 101 to implement the above procedures. Specifically, the CPU 101, ROM 102, and RAM 103 function as the means of comparison and control during execution of the program. The printing means consists of the printer internal members such as the photoconductor drum 11, the illuminating unit 12, and the fixing unit 15, as well as the members on the transport passage such as the transporting roller 21 and the transporting belt 22. The reduction process means consists of the image processing unit 106 and the double-side unit 23.

The first and second embodiments are applicable to printers, which are capable of expanding their functions by means of installing application software provided by the computer readable record medium. Specifically, the above-described process can be implemented by that the CPU 101 executes the program provided by the record medium and installed on the hard disk device 105 and the RAM 103, instead of the program stored on the ROM.

The printers according to the first and the second embodiments have an image forming mechanism that is similar to those of copying machines and facsimile machines. Therefore, the above-described process can be easily applied to copying machines and facsimile machines.

In case of a copying machine, an image data read by an image reading device provided on the copying machine is used instead of an image data transmitted by external equipment such as a computer. Once the image data is stored on a storage device of the copying machine such as a hard disk or an image memory, a procedure similar to the one described above is executed. As a result, the number of sheets to be discharged on a tray of the copying machine is not going to exceed the capacity of the tray so that the entire document is going to be properly copied.

A facsimile machine uses an image data received via communication lines such as public telephone lines from a communication unit that sends or receives an image data. Once the image data is stored in a hard disk device of the facsimile machine, a procedure similar to the one described above is executed. As a result, the number of sheets to be discharged on a tray of the facsimile machine is not going to exceed the capacity of the tray so that an entire image data is going to be properly printed.

Embodiment 3

Figure 9:
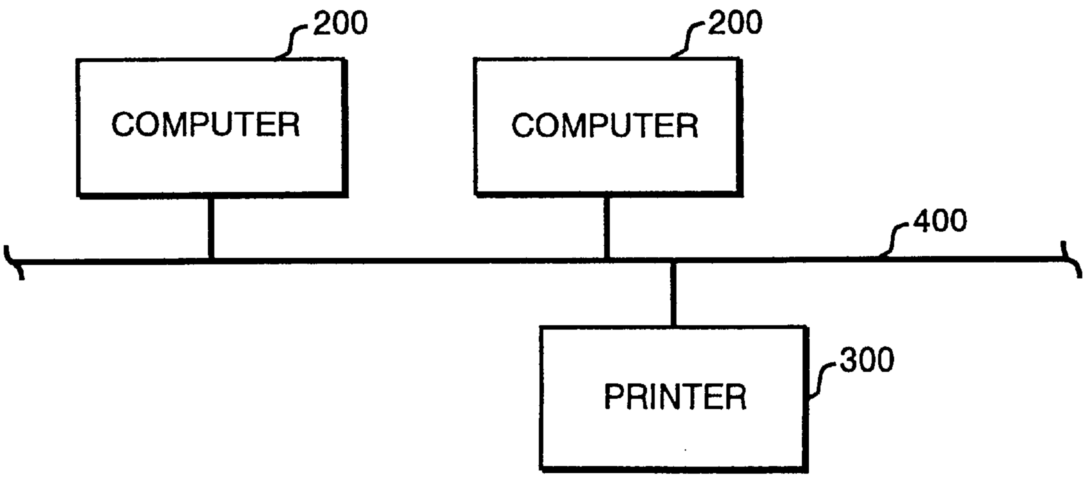
FIG. 9 is a block diagram of a computer system according to the third embodiment of the present invention.

The image forming system shown in FIG. 9 is a computer system, a kind of a LAN system, which consists of a printer 300 and a plurality of computers 200 connected to each other via a network channel 400. An image data prepared and/or edited by the computer 200 is transmitted to the printer 300 for printing. The reduction process is executed by the computer 200 in order to make the number of sheets required for printing an entire image data not to exceed a capacity of a tray provided in the printer 300.

Since this kind of computer system has been widely in use, the description of the computer and the printer's hardware composition is omitted. Also, although the drawing shows only one printer, the invention is applicable to an image forming system having a plurality of printers.

Figure 10:
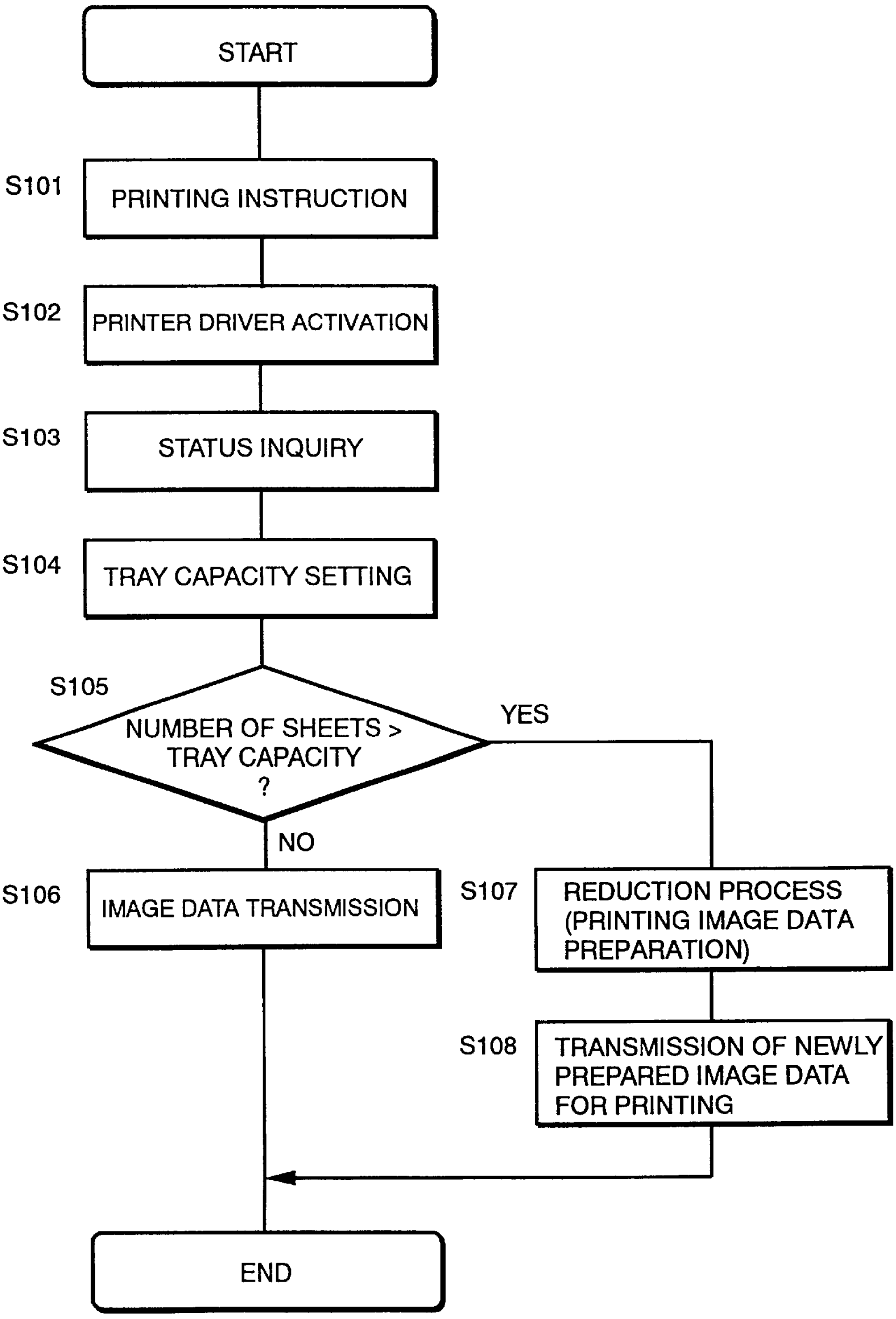
FIG. 10 is a flow chart of a printing process sequence.

Now, the control sequence for printing using the computer 200 is described referring to FIG. 10.

When the preparation and/or editing of the image data consisting of documents and graphics using the application software of the computer 200 are completed, the printing instruction will be issued (step S101).

Next, a printer driver is activated (step S102), and the status of the printer 300 such as the capacity of the tray and the presence of the double-side unit, is inquired (step S103).

If a sensor (refer to the sensor 18 of the first embodiment) is provided to detect the number of sheets stacked on the tray of the printer 300, the capacity of the tray sent from the printer 300 represents the current value. If the printer 300 does not have a function of sending the capacity of the tray as the status, it is possible to use a predetermined value, for example, the initial capacity unique to the particular tray.

Next, the capacity of the tray or the received data is set (step S104), and the number of the sheets required for printing the entire image data is compared with the capacity of the tray (step S105).

If the number of sheets required for the printing does not exceed the capacity of the tray as a result of the comparison at the step S105, the normal processes, i.e., the rasterizing and spooling processes are executed and the image data is transmitted to the printer 300 when the job acceptance at the printer 300 is approved (step S106).

If the number of sheets required for the printing exceeds the capacity of the tray as a result of the comparison at the step S105, the reduction process is executed by the computer 200 in order to reduce the number of sheets required for the printing (step S107). In the reduction process, the image data for printing is newly prepared by the image processing in order to print the image data for a plurality of pages on a sheet of paper as described before.

Specifically, the 2-in-1 process for printing the image data for two pages on one side of the sheet, or the 4-in-1 process for printing the image data for four pages on one side of the sheet is executed. If it is ascertained that a double-side unit exists based on the status information of the printer 300 obtained by the step S103, it is possible to execute the double-side process, the double side 2-in-1 process for printing the image data for four pages on two sides of a single sheet or two pages of image per side, or the double side 4-in-1 process for printing the image data for eight pages on two sides of a single sheet or four pages of image per side.

The format of the reduction process executed at the step S107 is automatically selected from the reduction candidates that enable full printing of the image data. The reduction candidates are extracted the same way as in the procedure for the first embodiment shown in FIG. 6. The automatic selection of the reduction process is appropriately executed, for example, according to the list for the second embodiment shown in FIG. 8. The selection of the reduction process is possible not only by the automatic method but also by the manual method. For example, as the example shown in FIG. 5, it is possible to show the reduction candidates that enable full printing of the image data and the reduction candidates that enable partial printing of the image data on the display of the computer 200 and let the user to select an appropriate one.

Next, the normal processes, i.e., the rasterizing and spool processes of the image data newly prepared by the reduction process are executed by the printer driver and, when the job receiving at the printer 300 is approved, the image data is transmitted to the printer 300 (step S106). If there is an instruction for the double-side printing, it is also transmitted to the printer 300.

As seen in the above, when the image data exists that exceeds the capacity of the tray of the printer, the image data is processed in such a way as to reduce the number of sheets required for the printing and the data thus obtained is transferred to the printer. Therefore, the number of sheets to be discharged will not exceed the capacity of the tray and the entire image data will be printed.

The actual process is conducted by the computer 200 executing the program prepared according to the control sequence described above. The program is provided, for example, stored in the record medium that is readable by the computer. Moreover, the program can be provided as independent application software or as a part of the printer driver's function.

It is obvious that this invention is not limited to the particular embodiments shown and described above but may be variously changed and modified by any person of ordinary skill in the art without departing from the technical concept of this invention.

The printers according to the first and second embodiments have only one tray 17 for collecting the sheets after printing. However, the present invention is also applicable to a finisher equipped with a plurality of discharge pins. For example, a finisher, which has a plurality of discharge bins and is so designed as to detect current capacities of the discharge bins, can execute the reduction process such as the double-side process, the 2-in-1 process and the 4-in-1 process, when the number of sheets needed for printing exceeds the current capacity of the relevant discharge bin.

The image forming system of the third embodiment consists of the printer 300 and a plurality of the computers 200 connected to each other via the network channel 400, and the printer 300 is directly controlled by the computer 200. However, the present invention is not construed to be limited to this constitution. It is also applicable to a system having a print server that stores an image data sent from a computer and outputs the image data sequentially to the printer. In such a case, it is constituted in such a way that the print server compares the capacity of the tray with the number of sheets required for the printing and executes the reduction process as needed based on the result of the comparison.

What is claimed is:

1. An image forming apparatus comprising:

a receiving unit for receiving a printing job that includes image data;

a counting unit for counting a number of sheets required by the printing job when an image for one page is formed on a sheet of paper;

an image forming unit for automatically forming images for a plurality of pages on a sheet of paper when the number of sheets exceeds a prescribed value; and a tray for receiving an image formed sheet.

2. An image forming apparatus according to claim 1, further comprising a reading unit for reading an image data of a document.

3. An image forming apparatus according to claim 1, in which said prescribed value is an initial capacity of said tray.

4. An image forming apparatus according to claim 1, further comprising a detection unit for acquiring a current capacity of said tray, in which said prescribed value is said current capacity.

5. An image forming apparatus according to claim 1, in which said image forming unit forms an image for one page on each of two sides of a sheet of paper when the number of sheets exceeds the prescribed value.

6. An image forming apparatus according to claim 1, in which said image forming unit forms images for two pages on one side of a sheet of paper when the number of sheets exceeds the prescribed value.

7. An image forming apparatus according to claim 1, in which said image forming unit forms images for two pages on each of two sides of a sheet of paper when the number of sheets exceeds the prescribed value.

8. An image forming apparatus according to claim 1, in which said image forming unit forms images for four pages on one side of a sheet of paper when the number of sheets exceeds the prescribed value.

9. An image forming apparatus according to claim 1, in which said image forming unit automatically forms images for a plurality of pages on a sheet of paper based on a format of a reduction process that enables printing all pages of the image data on a single sheet of paper, as selected according to a prescribed priority.

10. An image forming system comprising:

a printer for printing an image data; and a computer for preparing the image data, including a counting means for counting a number of sheets required by prepared image data when an image for one page is formed on a sheet of paper, an image preparing means for newly preparing image data for automatically forming images for a plurality of pages on a sheet of paper when the number of sheets exceeds a prescribed value, a job preparing means for preparing a printing job containing the newly prepared image data, and a transmitting means for transmitting the printing job to said printer.

11. An image forming system according to claim 10, in which said printer has a tray for receiving a printed sheet, wherein said prescribed value is an initial capacity of said tray.

12. An image forming system according to claim 10, in which said printer comprises a tray for receiving a printed sheet, a detection means for acquiring an current capacity of said tray, and a transmission means for transmitting said current capacity to said computer, and said computer comprises a receiving means for receiving said current capacity, wherein said prescribed value is said current capacity.

13. An image forming system according to claim 10, in which said image preparing means newly prepares image data for forming an image for one page on each of two sides of a sheet of paper when the number of sheets exceeds the prescribed value.

14. An image forming system according to claim 10, in which said image preparing means newly prepares image data for forming images for two pages on one side of a sheet of paper when the number of sheets exceeds the prescribed value.

15. An image forming system according to claim 10, in which said image preparing means newly prepares image data for forming images for two pages on each of two sides of a sheet of paper when the number of sheets exceeds the prescribed value.

16. An image forming system according to claim 10, in which said image preparing means newly prepares image data for forming images for four pages on one side of a sheet of paper when the number of sheets exceeds the prescribed value.

17. An image forming system according to claim 10, in which said image preparing means newly prepares image data for forming images for a plurality of pages on a sheet of paper based on a format of a reduction process that enables printing all pages of the image data on a single sheet of paper, as selected according to a prescribed priority.

18. A record medium stored in a computer-readable manner a program to be executed by the computer for printing an image data on a paper, in which said program comprises the steps of:

(A) acquiring a number of sheets required by prepared image data when an image for one page is formed on one sheet of paper, (B) newly preparing image data for automatically forming images for a plurality of pages on a sheet of paper when the number of sheets exceeds the prescribed value, (C) preparing a printing job including the newly prepared image data, and (D) transmitting the printing job to a printer.

19. A record medium according to claim 18, in which said program further comprises the step of (E) setting a initial capacity of a tray, to which an image formed sheet is discharged, to the prescribed value of said step (B).

20. A record medium according to claim 18, in which said program further comprises the steps of (F) acquiring a current capacity of a tray, to which an image formed is discharged, and (G) setting the current capacity to the prescribed value of said step (B).

21. A record medium according to claim 20, in which the step (F) of said program composed of (1) inquiring the current capacity of said tray, to which an image formed sheet is discharged, and (2) receiving the current capacity to be responded.

22. A record medium according to claim 18, in which the step (B) of said program consist of newly preparing image data for forming an image for one page on each of two sides of a sheet of paper when the number of sheets exceeds the prescribed value.

23. A record medium according to claim 18, in which the step (B) of said program consist of newly preparing image data for forming images for two pages on one side of a sheet of paper when the number of sheets exceeds the prescribed value.

24. A record medium according to claim 18, in which the step (B) of said program consist of newly preparing image data for forming images for two pages on each of two sides of a sheet of paper when the number of sheets exceeds the prescribed value.

25. A record medium according to claim 18, in which the step (B) of said program consist of newly preparing image data for forming images for four pages on one side of a sheet of paper when the number of sheets exceeds the prescribed value.

26. A record medium according to claim 18, in which the new preparation of image data in the step (B) of said program is based on a format of a reduction process that enables printing all pages of the image data on a single sheet of paper, as selected according to a prescribed priority.

27. An image forming method comprising the steps of:

(A) receiving a printing job including image data;

(B) acquiring a number of sheets required for a printing job when an image for one page is formed on a sheet of paper;

(C) automatically forming images for a plurality of pages on a sheet of paper when the number of sheets exceeds the prescribed value; and (D) discharging an image formed sheet to a tray.

28. An image forming method according to claim 27, further comprising the step of (E) setting an initial capacity of said tray to the prescribed value of said step (C).

29. An image forming method according to claim 27, further comprising the steps of (F) acquiring a current capacity of said tray, and (G) setting said current capacity to the prescribed value of said step (C).

30. An image forming method according to claim 27, in which said step (C) consists of forming an image for one page on each of two sides of a sheet of paper when the number of sheets exceed the prescribed value.

31. An image forming method according to claim 27, in which said step (C) consists of forming images for two pages on one side of a sheet of paper when the number of sheets exceed the prescribed value.

32. An image forming method according to claim 27, in which said step (C) consists of forming images for two pages on each of two sides of a sheet of paper when the number of sheets exceed the prescribed value.

33. An image forming method according to claim 27, in which said step (C) consists of forming images for four pages on one side of a sheet of paper when the number of sheets exceed the prescribed value.

34. An image forming method according to claim 27, in which the automatic formation of images in said step (C) is based on a format of a reduction process that enables printing all pages of the image data on a single sheet of paper, as selected according to a prescribed priority.

35. An image forming apparatus comprising:

a receiving unit for receiving a printing job that includes image data;

a counting unit for counting a number of sheets required by the printing job when an image for one page is formed on a sheet of paper;

a display unit for displaying candidates of reduction processes that enable printing all pages of the image data on a single sheet of paper when the number of sheets exceeds a prescribed value;

an image forming unit for forming images for a plurality of pages on a sheet of paper according to a format of a reduction process selected among the candidates; and a tray for receiving an image formed sheet.

36. An image forming system comprising:

a printer for printing image data; and a computer for preparing the image data, including counting means for counting a number of sheets required by the prepared image data when an image for one page is formed on a sheet of paper, display means for displaying candidates of reduction processes that enable printing all pages of image data on a single sheet of paper when the number of sheets exceeds a prescribed value, image preparing means for newly preparing image data for forming images for a plurality of pages on a sheet of paper according to a format of a reduction process selected among the candidates, job preparing means for preparing a printing job containing the newly prepared image data, and transmitting means for transmitting the printing job to said printer.

37. A record medium stored in a computer-readable manner a program to be executed by the computer for printing an image data on a paper, in which said program comprises:

(A) acquiring a number of sheets required by prepared image data when an image for one page is formed on one sheet of paper;

(B) displaying candidates of reduction processes that enable printing all pages of image data on a single sheet of paper when the number of sheets exceeds a prescribed value;

(C) newly preparing image data for forming images for a plurality of pages on a sheet of paper according to a format of a reduction process selected among the candidates;

(D) preparing a printing job including the newly prepared image data; and (E) transmitting the printing job to a printer.

38. An image forming method comprising the steps of:

(A) receiving a printing job including image data;

(B) acquiring a number of sheets required for the printing job when an image for one page is formed on a sheet of paper;

(C) displaying candidates of reduction processes that enable printing all pages of the image data on a single sheet of paper when the number of sheets exceeds a prescribed value;

(D) forming images for a plurality of pages on a sheet of paper according to a format of a reduction process selected among the candidates; and (E) discharging an image formed sheet to a ray.

* * * * *